United States Patent [19]

Mauletti

[11] Patent Number: 5,606,235
[45] Date of Patent: Feb. 25, 1997

[54] INDUSTRIAL ROBOT WITH INTEGRATED REDUCTION GEAR UNITS

[75] Inventor: Enrico Mauletti, Collegno, Italy

[73] Assignee: COMAU S.p.A., Grugliasco, Italy

[21] Appl. No.: 355,344

[22] Filed: Dec. 12, 1994

[30] Foreign Application Priority Data

Dec. 17, 1993 [IT] Italy .................. TO93A0960

[51] Int. Cl.⁶ .................................................. G05B 11/32
[52] U.S. Cl. .............. 318/625; 318/568.11; 318/568.21; 318/8; 318/12; 901/23; 901/25; 901/29; 901/28; 414/4; 74/479.01
[58] Field of Search ...................... 318/51, 45, 8, 318/625, 12, 13, 568, 568.11, 568.21; 364/474.11; 901/17, 23, 15, 25, 16, 29, 28; 414/4; 74/479 B, 479 BP, 479 BJ

[56] References Cited

U.S. PATENT DOCUMENTS

| | | |
|---|---|---|
| 3,893,573 | 7/1975 | Fletcher . |
| 4,431,366 | 2/1984 | Inaba et al. ............... 414/4 X |
| 4,585,387 | 4/1986 | Jayne . |
| 4,690,010 | 9/1987 | Matsumoto et al. ........... 901/25 X |
| 4,738,576 | 4/1988 | Eberle et al. ................ 414/4 |
| 4,773,813 | 9/1988 | Nakashima et al. ........... 318/568 X |
| 4,846,015 | 7/1989 | Keppler et al. .............. 901/25 X |
| 4,976,165 | 12/1990 | Nagahama ................. 901/26 X |
| 5,016,489 | 5/1991 | Yoda . |
| 5,050,450 | 9/1991 | Nakamura ................. 901/29 X |
| 5,187,996 | 2/1993 | Torii et al. ................ 414/4 X |
| 5,357,824 | 10/1994 | Hashimoto ................ 901/23 X |

FOREIGN PATENT DOCUMENTS

| | | |
|---|---|---|
| 3808121 | 9/1989 | Germany . |
| 1111039 | 4/1968 | United Kingdom . |
| 2243142 | 10/1991 | United Kingdom . |

*Primary Examiner*—Karen Masih
*Attorney, Agent, or Firm*—Sughrue, Mion, Zinn, Macpeak & Seas

[57] ABSTRACT

An industrial robot is provided with a plurality of elements articulated to each other, whose rotation is driven by respective electric motors by reduction gear units which are integrated in the structure of these elements.

2 Claims, 7 Drawing Sheets

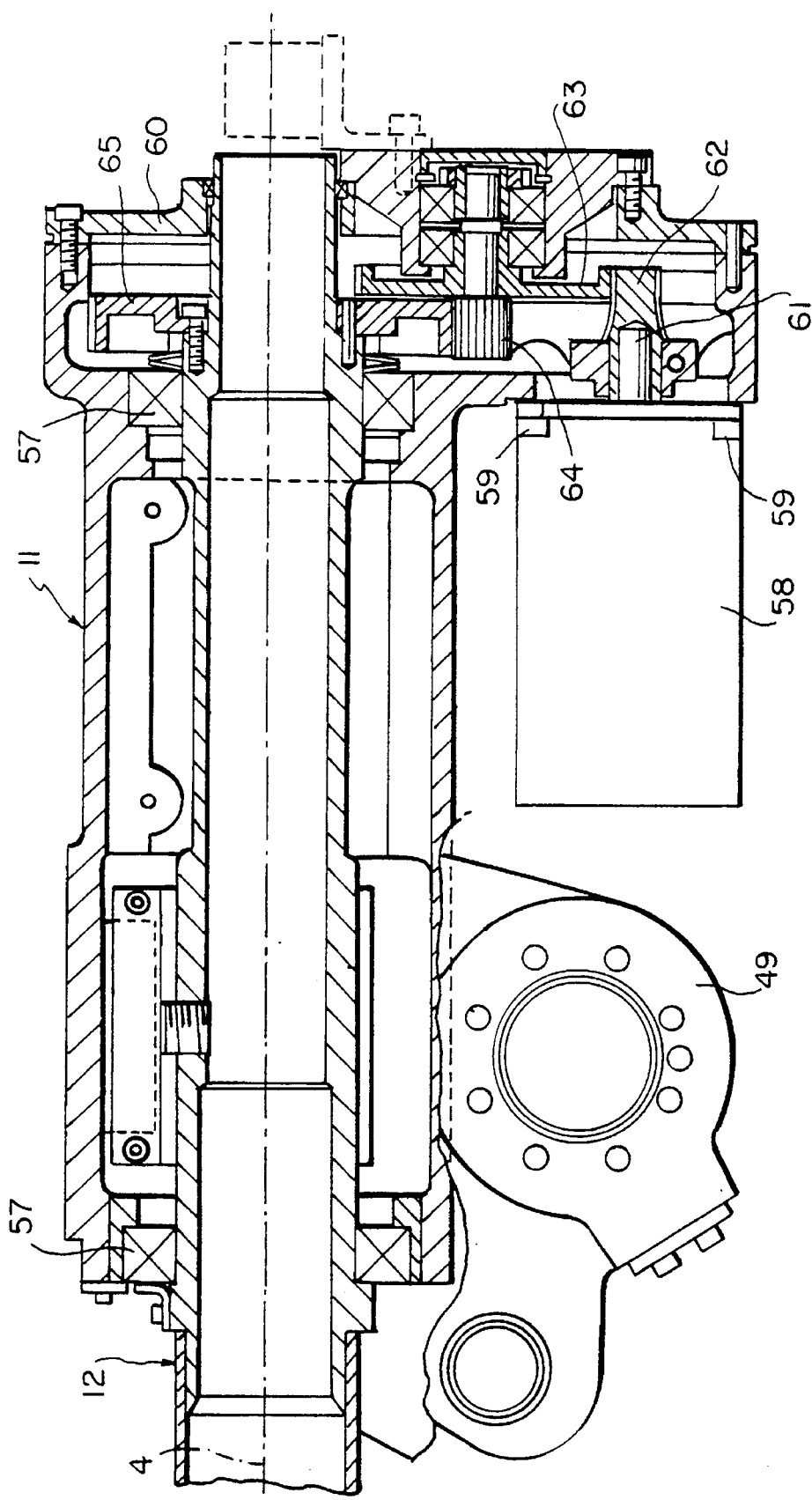

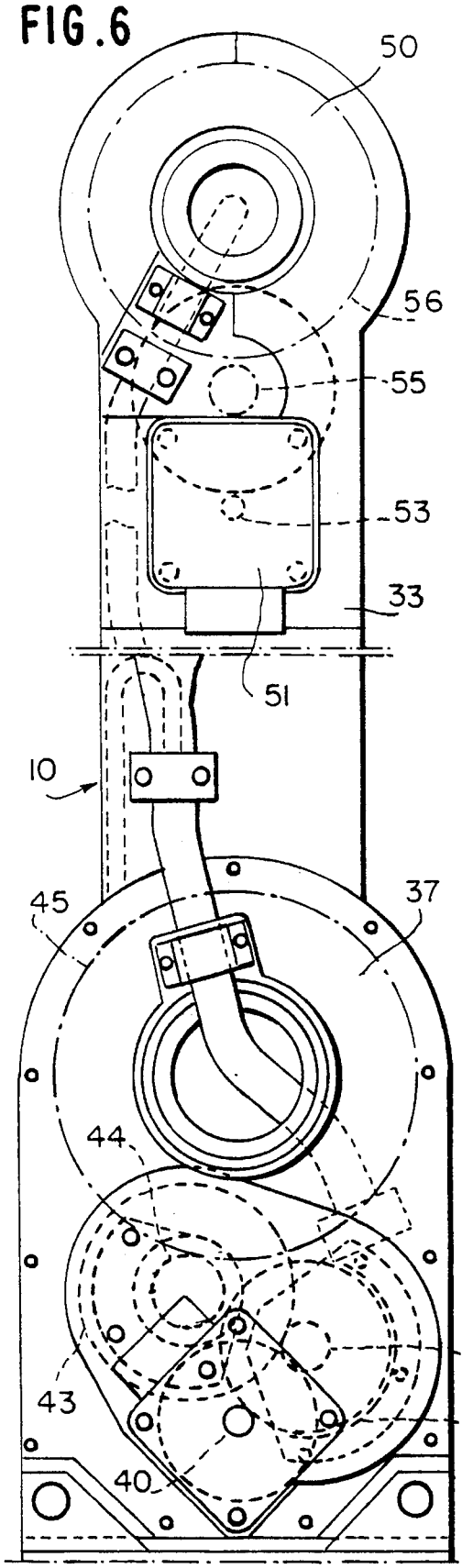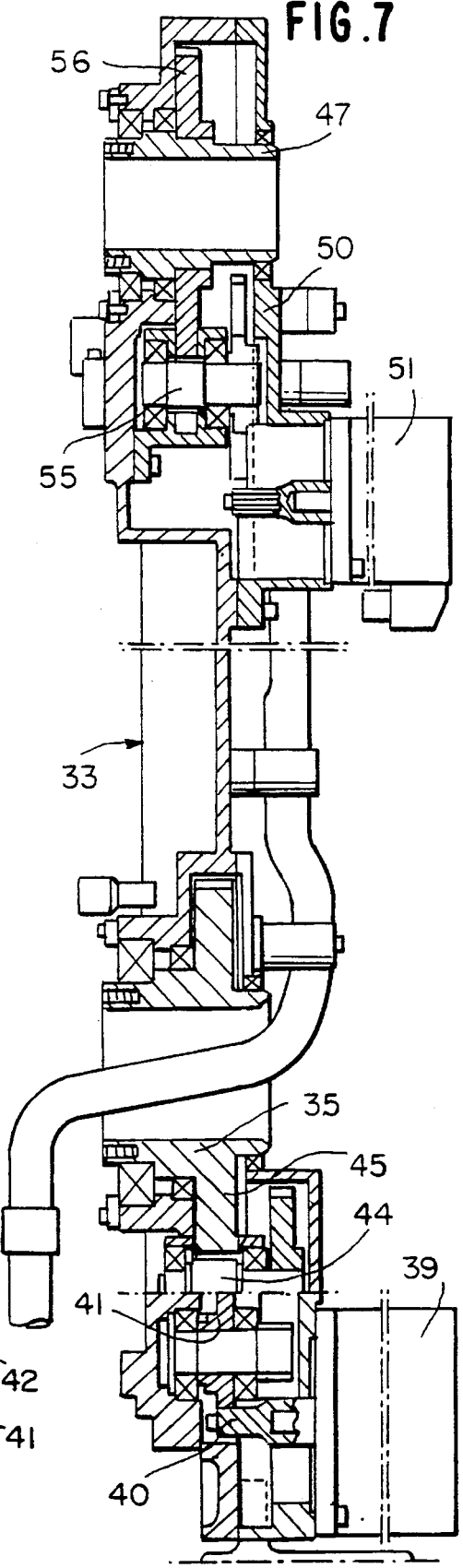

INDUSTRIAL ROBOT WITH INTEGRATED REDUCTION GEAR UNITS

BACKGROUND OF THE INVENTION

The present invention relates to industrial robots of the type comprising a plurality of elements which are articulated to each other around respective articulation axes and provided with a plurality of electric motors for driving rotation of each articulated element of the robot around the respective articulation axis and a reduction gear unit interposed in the connection between each electric motor and the respective driven element, each reduction gear unit comprising a casing which supports an inner gear reduction transmission.

According to the conventional art, the electric motors and the reduction gear units are separate units with respect to the structure of the various articulated elements of the robot, such units being mounted on these elements when the robot is assembled. This solution however is not fully satisfactory from the standpoint of simplicity of manufacture and assembling, since it requires in particular a number of adjustment operations to be carried out once the reduction gear units have been mounted onto the respective support structures, with a resulting increase in production costs.

SUMMARY OF THE INVENTION

The object of the present invention is that of providing an industrial robot of the type specified at the beginning, which is particularly, but not exclusively, to be produced as a robot of small size, e.g. for carrying out arc-welding operations or for handling relatively light articles, having a very simple structure comprised of a reduced number of parts and that can be assembled with easy and quick operations.

In order to achieve this object, the invention provides an industrial robot of the type indicated at the beginning, characterized in that for at least some of said articulated elements of the robot, the respective reduction gear unit is integrated within the structure of the robot element, in that said structure constitutes the casing of the reduction gear unit and directly supports the gear transmission of the reduction gear unit.

Each of said reduction gear units comprises an input shaft and an output shaft rotatably supported by the structure of the respective articulated element and at least a pair of straight gears meshing with each other for connecting the input shaft to the output shaft according to a predetermined reduction ratio.

According to a further preferred feature of the robot of the invention, one of the elements of the robot is constituted by an arm having both ends articulated to further elements of the robot, an electric motor fixed to the arm structure and a reduction gear unit integrated in the arm structure being associated with each end of said arm.

Due to said features, the structure of the robot is greatly simplified and comprised of a very reduced number of parts. The operations for assembling the robot are simple and rapid, since the various parts of the reduction gear unit are supported directly by the structure of the respective elements of the robot and do not require adjustment of their position. The solution which provides for the use of pairs of straight gears is preferred (even if other solutions are also possible) from the standpoint of simplicity and economy of manufacture, simplicity in taking up plays and simplicity in assembling.

It is further possible to provide for the use of reduction gear units identical to each other at various areas of the robot, so as to allow a certain degree of modularity in production.

In a first embodiment, the robot according to the invention comprises a base, a column rotatably mounted around a first vertical axis on the base, an arm rotatably mounted on the column around a second horizontal axis, a fore-arm rotatably mounted on said arm around a third axis parallel to said second axis, a stem mounted on the extension of the fore-arm and rotatable around a fourth axis, coincident with the longitudinal axis of the fore-arm, a wrist mounted on the end of said stem and articulated around a fifth and a sixth axes perpendicular to each other.

In a second embodiment, the robot according to the invention comprises a fixed support body, an arm rotatably mounted around a first vertical axis on the fixed support body, a second body rotatably mounted around a second axis which is also vertical, below said arm, a parallelogram linkage rotatably mounted around a third horizontal axis on said second body and a wrist carried by said parallelogram linkage and articulated around a fourth and a fifth axes perpendicular to each other.

Said arm which is articulated at both its ends, forming part of the robot according to the invention, may be both the arm which connects the second and third axes in the robot according to the first embodiment, and the arm which connects the first and the second axes in the robot according to the second embodiment of the invention.

The invention is also directed to said arm taken per se, which can be used in the production of robots of various types, according to a modularity criterion which enables the production to be rationalized and reduced in cost.

BRIEF DESCRIPTION OF THE DRAWINGS

Further features and advantages of the invention will become apparent from the description which follows with reference to the annexed drawings, given purely by way of non limiting example, in which:

FIG. 5 is a further partial view, at an enlarged scale and in cross section of a further detail of the robot of FIG. 1, FIGS. 6, 7 are a front view and a cross-sectional view of the arm of FIG. 3 which show the passages of the cables for electric supply to the robot.

DETAILED DESCRIPTION OF THE INVENTION

Figure 1:
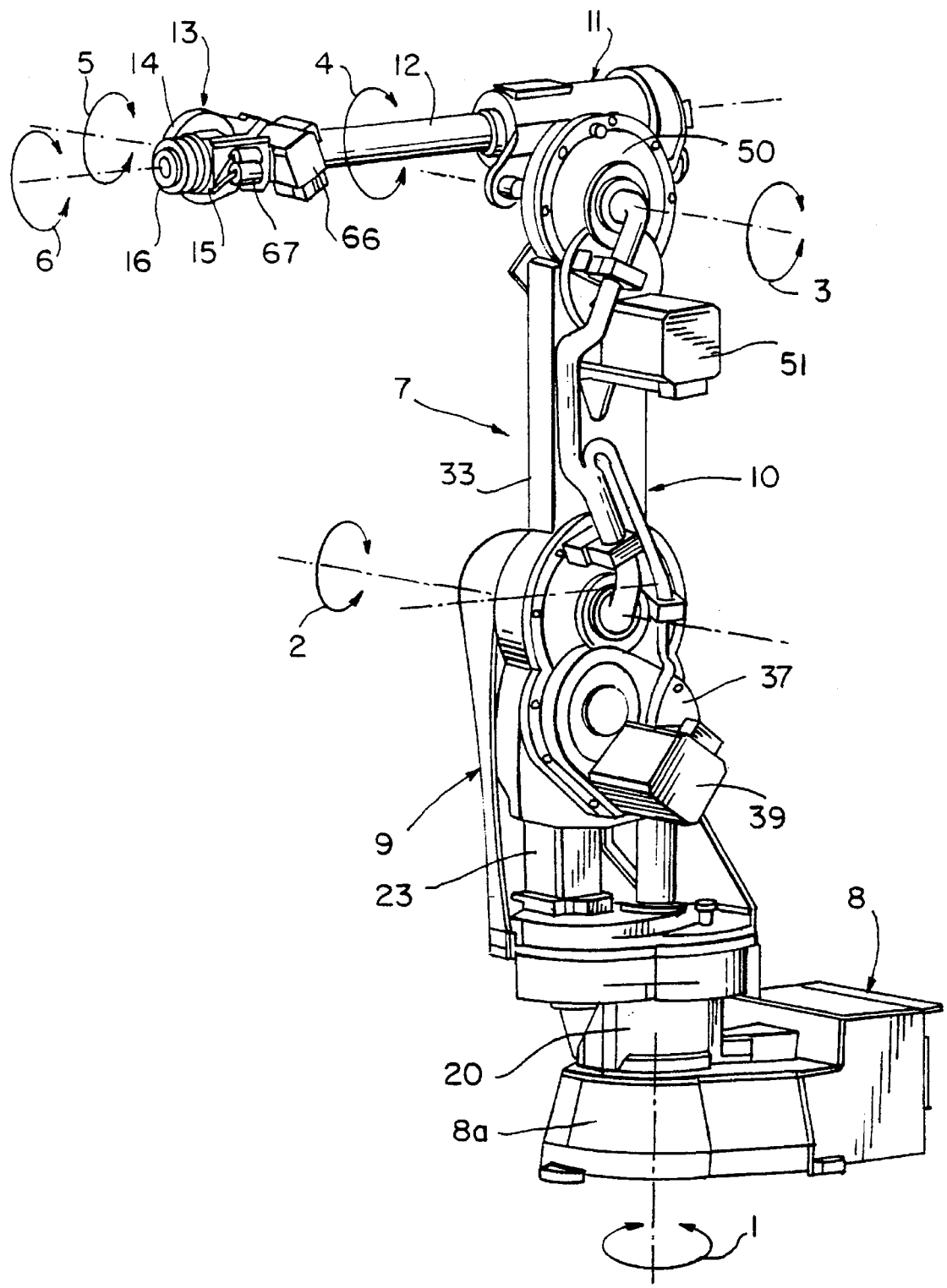
FIG. 1 is a perspective view of a first embodiment of the robot according to the invention.

With reference to FIG. 1, the arched arrows respectively indicated by 1, 2, 3, 4, 5 and 6 designate the sixth articulation axes of the robot. The latter is generally designated by reference numeral 7 and comprises a lower base 8 on which a column 9 is rotatably mounted around the vertical axis 1. Column 9 on its turn rotatably supports an arm 10 around the horizontal axis 2. The arm 10 on its turn rotatably supports the body 11 of a fore-arm around the horizontal axis 3. The fore-arm is extended by a stem 12 which is rotatably supported by the body 11 around the axis 4 of the robot, coincident with the longitudinal axis of the fore-arm. Stem 12 ends with a robot wrist 13 which is articulated around the two axes 5, 6, which are perpendicular to each other. More precisely, wrist 13 includes a body 14 which is fixed to the free end of stem 12, a body 15 rotatably mounted on body 14 around axis 5 and a body 16 rotatably mounted on body 15 around axis 6.

Figure 2:
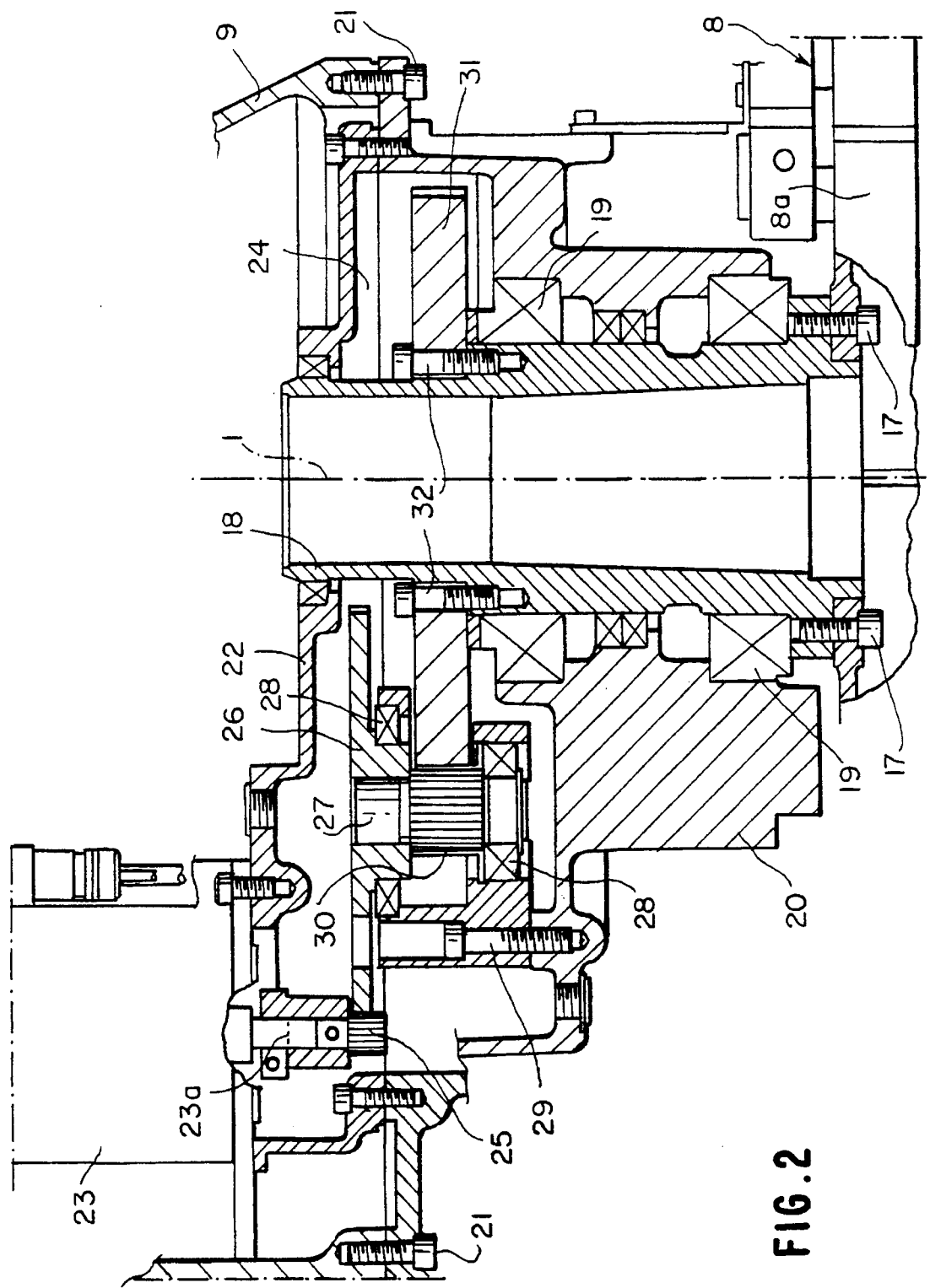
FIG. 2 is a partial view, at an enlarged scale and in cross section of a detail of the robot of FIG. 1.

FIG. 2 shows in detail the rotatable mounting of column 9 on base 8. The latter has a structure 8a, shown only partially in FIG. 2, above which there is fixed by screws 17 a vertical shaft 18 whose axis is coincident with axis 1. Shaft 18 is hollow, to allow for passage of cables for electric supply of the robot. Shaft 18 rotatably supports around axis 1, by taper roller bearings 19, a body 20 above which there is fixed, by screws 21, the structure of column 9. Furthermore, above body 20 there is mounted a lid 22 above which there is fixed an electric motor 23 which is for driving rotation of column 9 around axis 1. Lid 22 defines along with body 20 a closed chamber 24 containing a gear reduction transmission which connects the shaft of motor 23 to shaft 18. Therefore, body 20, along with lid 22, defines the casing of a gear reduction unit which is thus integrated in the robot. The input shaft of the reduction gear unit is the shaft of the electric motor 23, indicated by 23a, whereas the output shaft of the reduction gear unit is shaft 18. Since shaft 18 is fixed, actuation of electric motor 23 causes rotation of the whole structure comprised of body 20, lid 22 and column 9 mounted thereon, around shaft 18. More in detail, shaft 23a of the electric motor 23 has a straight pinion 25 which meshes with gear 26, which is also a straight gear. Gear 26 is mounted on a shaft 27 which is freely rotatably mounted by roller bearings 28 on a support structure fixed by screws 29 to body 20. Shaft 27 also carries a straight pinion 30, meshing with gear 31 which is also straight, which is mounted on shaft 18 and fixed thereto by screws 32. Shaft 23a of electric motor 23 and shaft 18 are therefore connected to each other by two gear pairs which provide a double reduction.

Figure 3:
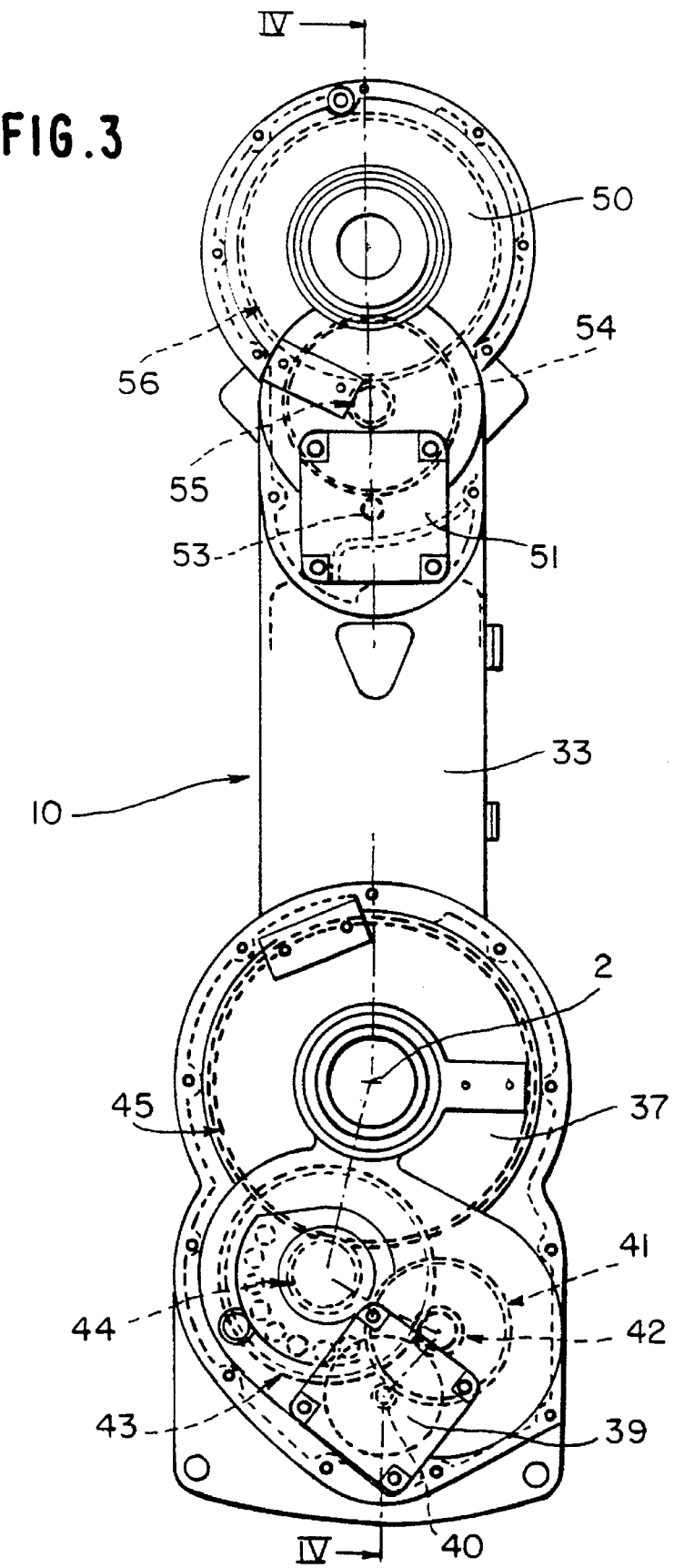
FIG. 3 is a view of the arm forming part of the robot of FIG. 1.
Figure 4:
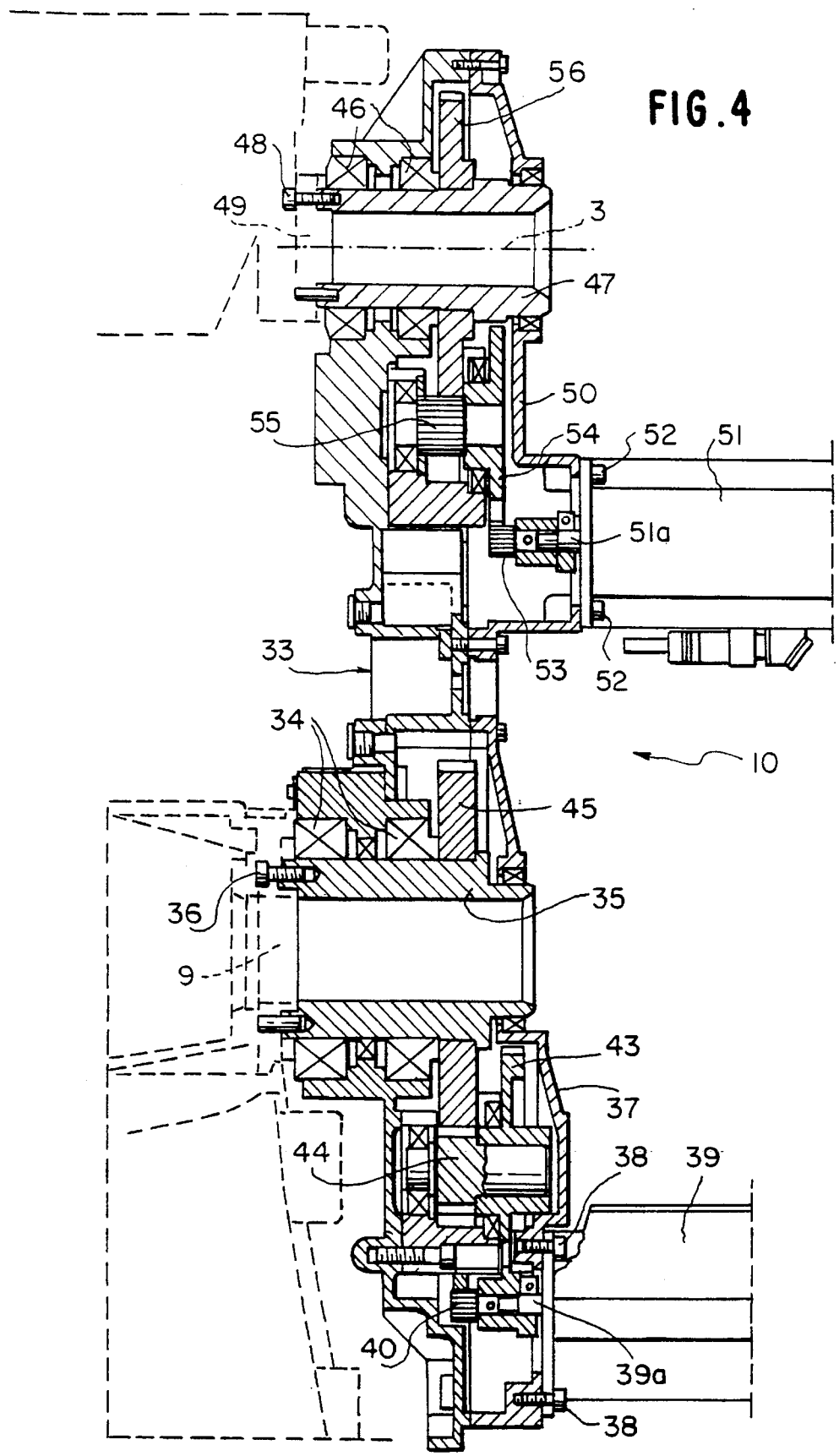
FIG. 4 is a cross-sectional view taken along line IV—IV of FIG. 3.

FIGS. 3, 4 show the arm 10 of the robot of FIG. 1, whose ends have two reduction gear units integrated therein for driving rotation of arm 10 around axis 2 and rotation of fore-arm around axis 3 respectively. Arm 10 has a body 33 obtained by casting, for example of light alloy or steel, which is rotatably mounted by taper roller bearings 34 on a shaft 35 having its axis coincident with axis 2 of the robot and fixed by screws 36 to the structure of column 9. At its lower portion, body 33 is provided with lid 37 on which there is fixed by screws 38 an electric motor 39 which is for driving rotation of the arm 10 around axis 2. Also in this case, the body 33 of the arm, along with lid 37, defines the casing of a reduction gear unit whose rotating parts are supported directly by said elements and connect the shaft of electric motor 39 to shaft 35, in this case through three subsequent reductions. Also in this case, shaft 35 is hollow to allow for passage of the cables for electric supply of the robot, as it will be more clearly apparent in the description of FIGS. 6, 7. Furthermore, also in this case, since shaft 35 is fixed to the structure of column 9, actuation of electric motor 39 causes rotation of the whole body 33 of arm 10 around axis 2.

More in detail, shaft 39a of electric motor 39 has a toothed straight pinion 40, which meshes with a gear 41 (FIG. 3) which is coaxial with a pinion 42. The latter meshes with a gear 43 coaxial with the pinion 44. The latter meshes with a gear 45 which is mounted on the shaft 35. Therefore, the three gear pairs 40, 41; 42, 43 and 44, 45 provide a triple reduction in the transmission of rotation from motor 39 to structure 33 carrying this motor around rotation axis 2.

At the opposite end of arm 10, structure 33 rotatably supports a shaft 47 around axis 3, by means of taper roller bearings 46, this shaft being also hollow to allow for passage of supply cables of the robot. The shaft 47 is fixed by screws 48 to a flange 49 of structure 11 of the fore-arm. On this portion of the body 33 of arm 10 there is mounted a lid 50 which defines along with body 33 the casing of a further reduction gear unit which connects the shaft of an electric motor 51 which is fixed by screws 52 to the lid 50, to shaft 47. In this case, shaft 51a of electric motor 51 carries a pinion 53 which meshes with gear 54 which is on its turn coaxial with a pinion 55 meshing with a gear 56 mounted on the shaft 47.

As it is clearly apparent from the foregoing description, arm 10 has a body in which there are integrated the two reduction gear units which are for driving rotation around the two axes 2, 3 and are directly connected to the arm itself. FIG. 5 shows in detail flange 49 fixed to shaft 47 and carrying body 11 of the fore-arm. The structure 11 rotatably supports the stem 12 around axis 4, by ball bearings 57. The rotation of stem 12 around axis 4 is driven by an electric motor 58 which is fixed by screws 59 to the body 11 and is connected to stem 12 by a reduction gear unit whose casing is constituted by the body 11 itself, which has a substantially cylindrical configuration (FIG. 1) and a lid 60 which closes the cavity of body 11 at one end.

In detail, the output shaft 61 of electric motor 58 carries a pinion 62 meshing with a gear 63 which is coaxial with a pinion 64 on its turn meshing with a gear 65 mounted on the stem 12. Thus, the latter is driven by electric motor 58 through a double reduction.

With reference to FIG. 1, finally wrist 13 comprises two electric motors 66, 67 for driving rotation of elements 15, 16 around axes 5, 6. The rotation of element 15 is driven by a reduction gear unit integrated within element 14 (not shown) substantially identical to the reduction gear unit associated with body 11. The reduction gear unit driving element 16 is instead a unit of conventional type, which is not integrated in the body, basically since the size of the wrist is very reduced. Therefore, the structure of this reduction unit is not illustrated herein, since it may be of any known type. However, it is clear that also the reduction gear unit associated with axis 6 of the robot might be integrated in the body of the robot itself.

As illustrated in the foregoing, the above described robot is particularly adapted to be provided in the form of a robot of relatively small size for carrying out arc-welding operations or for handling relatively light articles. In one embodiment made by the applicant, a small robot of the above described type has been provided, having a load capacity of 8 kilos.

FIGS. 6, 7 illustrate the parts which have been described already above and show utility of the hollow shafts in order to allow for passage of the robot supply cables.

From the foregoing description it is clearly apparent that the robot according to the invention is characterized by a great simplicity and a reduced number of parts. The various reduction gear units of the robot indeed do not form separate units, but are fully integrated in the body of the robot, which, beside reducing the number of components to a great extent, simplifies remarkably the assembling and adjusting operations of the robot, since the need to carry out the adjustment operations which are usually necessary with conventional robots is eliminated.

Figure 8:
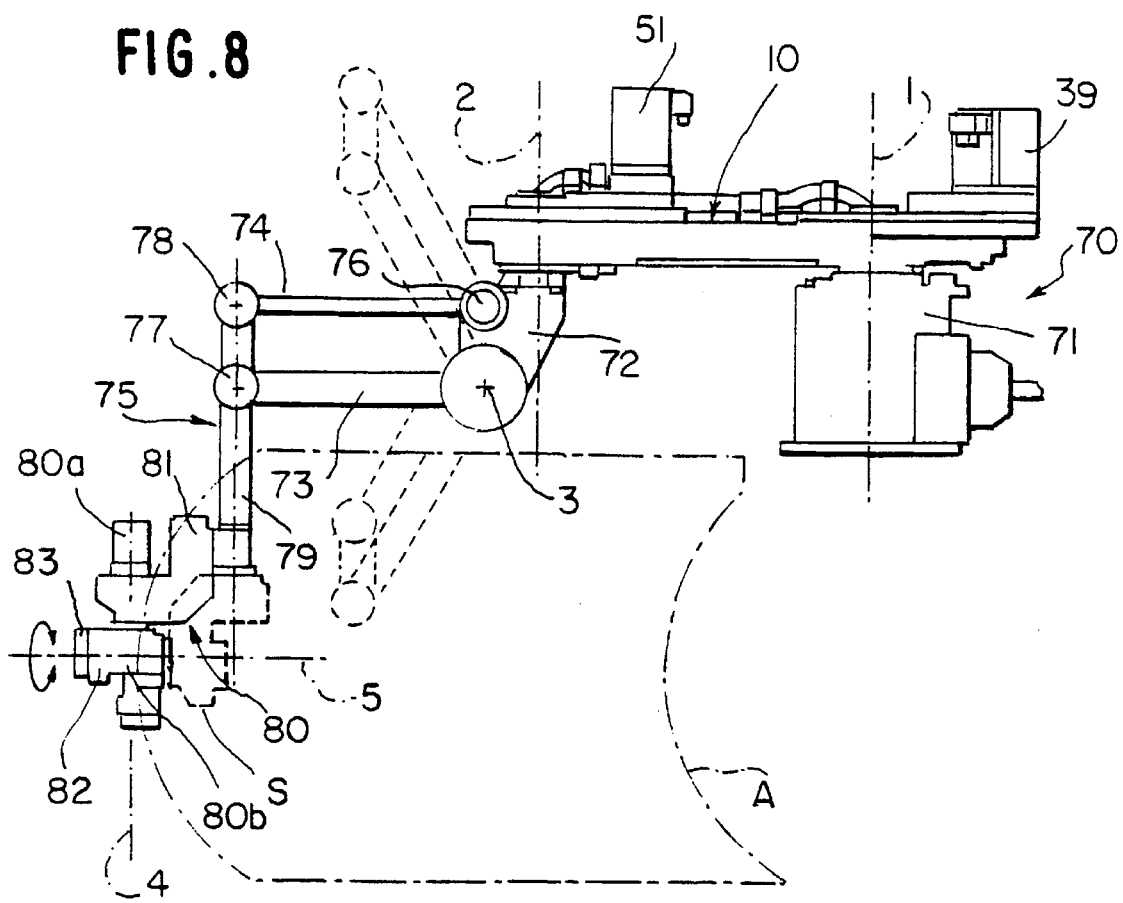
FIGS. 8, 9 are a side view and a plan view of a second embodiment of the robot according to the invention.
Figure 9:
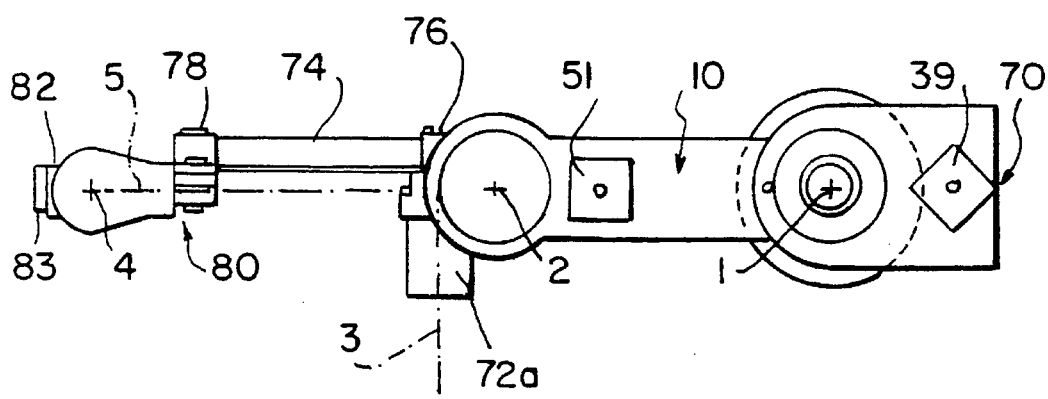

FIGS. 8, 9 show a second embodiment of the robot which exploits the same inventive principle. In this case the robot, generally designated by reference numeral 70, comprises a fixed body 71 which rotatably supports around a vertical axis 1 an arm 10 having the same body of arm 10 shown with reference to the robot of FIG. 1 and carrying similarly two electric motors 39, 51 with the corresponding integrated reduction gear units associated with its ends. Arm 10 rotatably supports around a vertical axis 2 a body 72 mounted below arm 10. The rotating body 72 rotatably supports around an axis 3 a lever 73 forming along with a further lever 74 a parallelogram linkage 75. Lever 74 is articulated to body 72 around an axis 76 parallel to axis 3. The two levers 73, 74 are articulated at 77 and 78 to an arm 79 carrying a wrist 80 comprising a first body 81, a second body 82 rotatably mounted below body 81 around a vertical axis 4 and a flange 83 rotatably mounted on body 82 around a horizontal axis 5.

As indicated above, also in this case the reduction gear units associated with axes 1, 2 are integrated in the body of arm 10. This structure is not described again herein, since it is identical to that of arm 10 of the robot of FIG. 1.

This arm may then be used both for making the robot of FIG. 1, and for making the robot of FIG. 8, to the advantage of modularity and rationalization in production. Also in the case of the robot of FIG. 8, the integration of the reduction gear units in the structure of arm 10 allows for a simplification in manufacture and a greater easiness in assembling.

The rotation of the parallelogram linkage 75 around axis 3 is driven by an electric motor and reduction gear unit 72a (FIG. 9), while rotations of elements 82, 83 around axes 4, 5 are controlled by electric motor and reduction gear units 80a, 80b (FIG. 8). The details of construction of the above mentioned units are not described herein and in the annexed drawings, since such details may be of any known type and do not fall, taken per se, within the scope of the present invention. Furthermore, the elimination of these details from the drawings renders the latter more easy to understand. In FIG. 8 dotted line A shows the outline of the area which may be reached by the robot wrist. Dotted line S shows an alternative mounting position of the wrist, in which axis 4 is horizontal and axis 5 is vertical.

Naturally, while the principle of the invention remains the same, the details of construction and the embodiments may widely vary with respect to what has been described and illustrated purely by way of example, without departing from the scope of the present invention. For example the gears of the reduction gear units might also not be straight gears.

What is claimed is:

1. An industrial robot comprising a plurality of elements articulated to each other around respective articulation axes, said elements including a base, a column rotatably mounted around a first vertical axis on the base, an arm rotatably mounted on the column around a second horizontal axis, a forearm rotatably mounted on said arm around a third axis parallel to said second axis, a stem mounted on an extension of the forearm and rotatable around a fourth axis coincident with the longitudinal axis of the forearm and a wrist mounted on an end of the stem and articulated around a fifth and sixth axes which are perpendicular to each other;

said robot further comprising a plurality of electric motors for driving rotation of each articulated element of the robot around the respective articulation axis and a reduction gear unit interposed in the connection between each electric motor and the respective driven element, wherein each reduction gear unit comprises a casing in which a gear reduction transmission is supported, wherein at least one of said articulated elements of the robot is provided with a body and the respective reduction gear unit is integrated in the body of the element of the robot, said body constituting the casing of the reduction gear unit for supporting the gear reduction transmission of the reduction gear unit, wherein each of said reduction gear units comprises an input shaft and an output shaft rotatably mounted within the body of the respective articulated element and at least one pair of straight gears meshing with each other for connecting the input shaft to the output shaft according to a predetermined reduction ratio, wherein each reduction gear unit comprises at least two gear pairs, and wherein one of the articulated elements of the robot is an arm having both ends articulated to further elements of the robot and with each end of said arm there is associated an electric motor fixed to the body of the arm and a reduction gear unit integrated in the body of the arm.

2. An industrial robot comprising a plurality of elements articulated to each other around respective articulation axes, said elements including a fixed body, an arm rotatably mounted around a first vertical axis on said fixed body, a rotatable body rotatably mounted around a second vertical axis below said arm, a parallelogram linkage rotatably mounted around a third horizontal axis on said rotatable body and a wrist carried by said parallelogram linkage and articulated around two axes which are perpendicular to each other;

said robot further comprising a plurality of electric motors for driving rotation of each articulated element of the robot around the respective articulation axis and a reduction gear unit interposed in the connection between each electric motor and the respective driven element, wherein each reduction gear unit comprises a casing in which a gear reduction transmission is supported, wherein at least one of said articulated elements of the robot is provided with a body and the respective reduction gear unit is integrated in the body of the element of the robot, said body constituting the casing of the reduction gear unit for supporting the gear reduction transmission of the reduction gear unit;

wherein each of said reduction gear units comprises an input shaft and an output shaft rotatably mounted within the body of the respective articulated element and at least one pair of straight gears meshing with each other for connecting the input shaft to the output shaft according to a predetermined reduction ratio, wherein each reduction gear unit comprises at least two gear pairs, and wherein one of the articulated elements of the robot is an arm having both ends articulated to further elements of the robot and with each end of said arm there is associated an electric motor fixed to the body of the arm and a reduction gear unit integrated in the body of the arm.

* * * * *